(12) United States Patent
Utaki

(10) Patent No.: US 7,677,024 B2
(45) Date of Patent: Mar. 16, 2010

(54) CABLE PROTECTION AND GUIDE DEVICE

(75) Inventor: Akihiko Utaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/098,426

(22) Filed: Apr. 5, 2008

(65) Prior Publication Data
US 2008/0283683 A1 Nov. 20, 2008

(30) Foreign Application Priority Data
May 14, 2007 (JP) .............................. 2007-127953

(51) Int. Cl.
*F16G 13/16* (2006.01)
*H02G 11/00* (2006.01)
(52) U.S. Cl. ........................... 59/78.1; 59/900; 348/49; 348/51
(58) Field of Classification Search ................. 59/78.1, 59/78; 248/49, 51
See application file for complete search history.

(56) References Cited

U.S. PATENT DOCUMENTS

| | | | | |
|---|---|---|---|---|
| 6,387,002 B1 * | 5/2002 | Gunter | ....................... | 474/206 |
| 6,745,555 B2 * | 6/2004 | Hermey et al. | ................ | 59/78.1 |
| 7,428,808 B2 * | 9/2008 | Utaki et al. | ................... | 59/78.1 |
| 7,451,589 B2 * | 11/2008 | Howard | ....................... | 59/78.1 |
| 7,513,097 B2 * | 4/2009 | Utaki et al. | ................... | 59/78.1 |

FOREIGN PATENT DOCUMENTS

JP 2006-250258 9/2006

\* cited by examiner

*Primary Examiner*—David B Jones
(74) *Attorney, Agent, or Firm*—Woodling, Krost and Rust

(57) ABSTRACT

A cable protection and guide device includes comb teeth-shaped connecting link units. A plurality of side plates of each unit are interconnected through coupling portions. Stopper links of an opposing unit fit between adjacent side plates and interengage the coupling portions. Stopper links limit the bending angle. Connecting arms are integrally molded with the side plates and reside on the bending inner circumferential side of the device opening/closing arms are integrally molded with one of the side plates and reside on the bending outer circumferential side. The comb teeth-shaped connecting link units are opposed to each other.

12 Claims, 8 Drawing Sheets

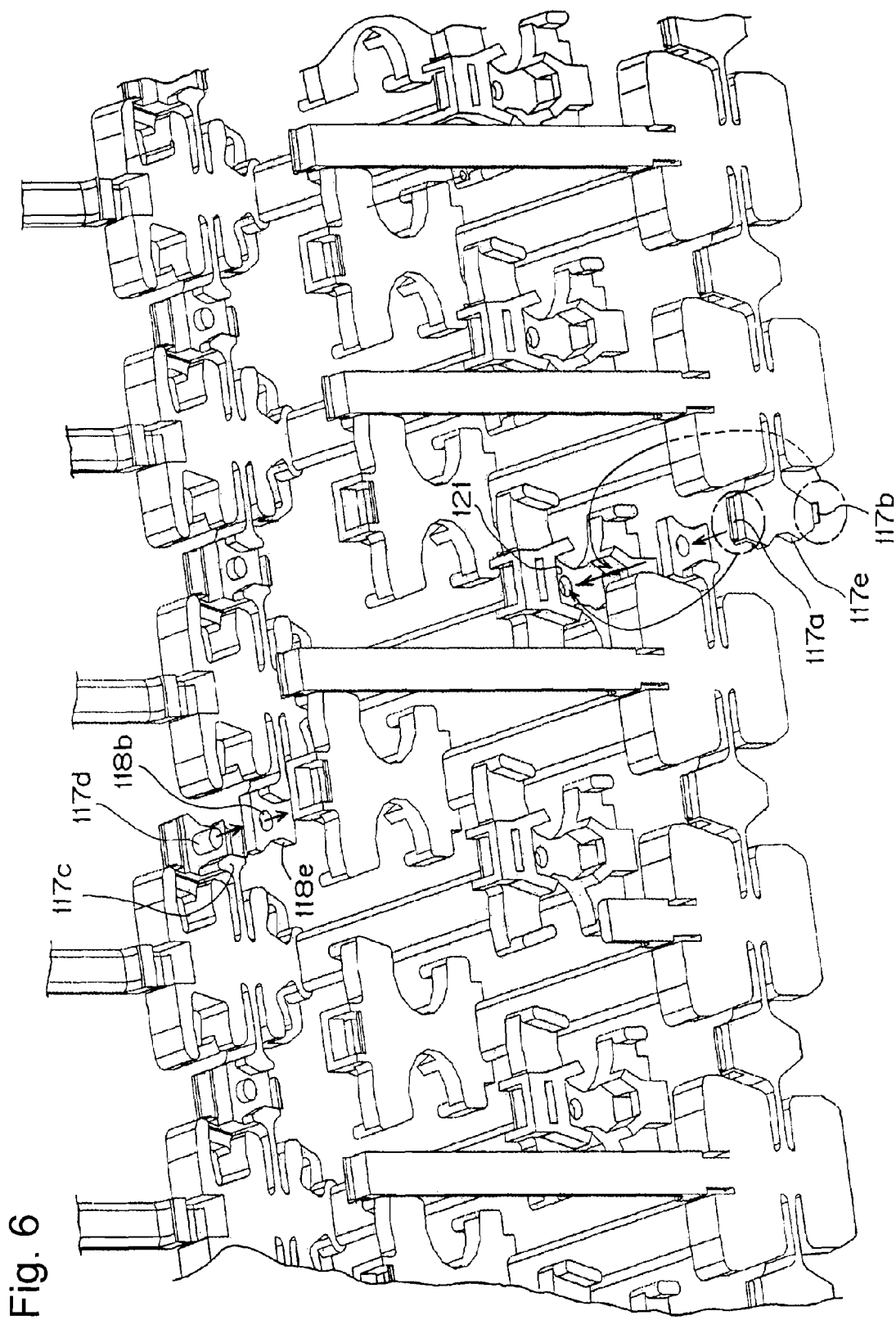

CABLE PROTECTION AND GUIDE DEVICE

This patent application claims priority to Japanese Patent Application Serial No. 2007-127953 filed May 14, 2007.

TECHNICAL FIELD

The present invention relates to a cable protection and guide device. More specifically it relates to a cable protection and guide device which accommodates a cable(s) or a hose(s) which supplies electrical and/or fluidic energy to a movable section of an industrial machine.

BACKGROUND TECHNOLOGY

FIG. 7 is a prior art cable protection and guide device which illustrates a number of pairs of right and left spaced side plate portions 510A and 510B connected to each other. FIG. 7 depicts a mounting fixed end and a mounting movable end. Connecting arms 520 are bridged on a bending inner circumferential side 500A and on a bending outer circumferential side 500B of the side plate portions 510A and 510B in alternating intervals. A cable or cables C are accommodated in a cable accommodating space which is rectangular in cross section. The cable accommodating space is surrounded by the pair of right and left side plate portions 510A and 510B and the connecting arms 520, 520 disposed in a bridged state on the bending inner circumferential side and on the bending outer circumferential side.

In such a conventional protection and guide device 500, pairs of right and left side plate portions 510A (510B) are integrally formed. Each of the pairs of right and left side plate portions 510A (510B) include front plate portions 511A connected to the preceding side plate portions 510A (510B). Rear plate portions 512A are connected to the subsequent side plate portions, and flexible coupling portions 513A intervene and are interposed between the front plate portions 511A and the rear plate portions 512A. Snap-fit mechanisms, which are connected to adjacent side plate portions 510A (510B) by engaging each other, are provided between rear plate portions 512A of the preceding side plate 510A (510B) and front plate portions 511A of subsequent side plate portions 510A (510B) connected to the rear plate portions 512A.

Adjacent side plate portions 510A (510B) interconnected through these snap-fit mechanisms are detachable from each other and maintenance can be easily attained.

FIG. 7, just described, is Japanese Laid-Open Patent Publication No. 2006-250258 sometimes referred to herein as Patent Reference 1.

PROBLEMS TO BE SOLVED BY THE INVENTION

In the above-described conventional cable protection and guide device of FIG. 7, one side plate portion 510A assumes a shape which has three parts: a front plate portion 511A, a rear plate portion 512A and a coupling portion 513A. The shape of the side plate portion 510A is complicated and the number of parts required is large. The respective side plate portions 510A are independent separate parts and connection of the side plate portions 510A takes considerable time. The right and left spaced side plates 510A are mirror images of each other and there is no interchangeability between the right and left side plate portions 510A. Thus in the conventional cable protection and guide device the number of parts is not only increased, but also it is necessary for the right and left side plates 510A, 510B to be respectively managed by being separated from each other and the management of the parts is complicated. Large tensile stress is generated in the coupling portion 513A during free span or bending. The endurance of the cable protection and guide device is not good.

Accordingly, the object of the present invention is to provide a cable protection and guide device which is excellent in endurance. Accordingly, another object of the present invention is to reduce the number or parts used, simplify the assembly operation and simplify the management of the parts.

MEANS FOR SOLVING THE PROBLEMS

The invention solves the above-described problems. A cable protection and guide device includes a plurality of spaced side plates connected to each other. Connecting arms are bridged on a bending inner circumferential side of the side plates at predetermined intervals. A cable is accommodated in a cable accommodating space surrounded by the side plates and the connecting arms. The cable protection and guide device includes connecting link modules formed by connecting the plurality of side plates through coupling portions and coupling portion arms extended from the coupling portions to adjacent side plates which include stopper links. The stopper link fits from the cable accommodating space side between adjacent two side plates forming the connecting link module and limiting the bending angle. Comb teeth-shaped connecting link units include the connecting link modules and the stopper links. The side plates form the connecting link modules and the stopper links and are connected by integrally molded connecting arms on the bending inner circumferential side. The comb teeth-shaped connecting link units are incorporated to each other such that they are opposed to each other.

The invention further solves the above-described problems in that the side plates are symmetric with respect to the central vertical line therethrough.

The invention further solves the above-described problems the stopper link is symmetric with respect to the central vertical line therethrough.

EFFECTS OF THE INVENTION

A cable protection and guide device in which a plurality of spaced side plate portions are connected to each other is disclosed herein. Connecting arms are bridged on a bending inner circumferential side of the side plates at predetermined intervals. A cable is accommodated in a cable accommodating space surrounded by the side plates and the connecting arms. The cable protection and guide device includes comb-teeth connecting link modules formed by connecting the plurality of side plates through coupling portions and coupling portion arms extended from the coupling portions to adjacent side plates. Stopper links which fit from the cable accommodating space between adjacent side plates form the connecting link modules and limit the bending angle. By limiting the bending angle it is meant that the radius of curvature is limited. Comb teeth-shaped connecting link units include the connecting link modules and the stopper links. The comb teeth-shaped connecting link units are incorporated to each other such that they are opposed to each other. The side plats form the connecting link modules and the stopper links are connected thereto by integrally molded connecting arms on the bending inner circumferential side. A plurality of side plates are connected to each other and respective side plates and stopper links are connected by integrally molded connecting arms so as to form one unit. Thus when the device is viewed as a whole, the number of parts is reduced simplifying assembly and parts management.

The tensile stress applied to an arm of the coupling portion of the side plates is dispersed. Thus the generation of large tensile stresses in the arm of the coupling portion is suppressed and the endurance is improved.

According to the cable protection and guide device, the side plate and the stopper link have a symmetric shape with respect to the central vertical line therethrough. Comb teeth-shaped connecting link units are incorporated with each other such that they are opposed to each other and are interchangeable. Thus, parts management is simplified. Only one connecting link unit is necessary.

In a cable protection and guide device, a plurality of spaced side plates are articulately connected to each other in a longitudinal direction enabling the side plates to form a flexional circumferential bend having a flexional inner circumferential side and flexional outer circumferential side. Each of the side plates includes a flexional inner circumferential side residing during bending on the flexional inner circumferential side of the bend. Each of the side plates includes an outer circumferential side residing during bending on the outer flexional circumferential side of the bend.

Connecting arms are respectively bridged on a bending inner circumferential side and opening/closing arms are bridged over a bending outer circumferential side of the side plates at predetermined intervals. A cable is accommodated in a cable accommodating space surrounded by the side plates and the connecting arms. Each of the comb teeth-shaped connecting link units include connecting link modules formed by connecting adjacent side plates through coupling portions and coupling portion arms extended from the coupling portions. Stopper links fit between adjacent side plates and form the connecting link modules and limit the bending angle of the device. The side plates and stopper links forming the connecting link modules are integrally molded and are connected by the connecting arms on the bending inner circumferential side. The comb teeth-shaped portions are opposed to each other and when the device is viewed as a whole, the number of required parts is reduced and assembly and parts management is simplified. Different examples or embodiments not expressly described herein are within the spirit and scope of the appended claims.

The materials of the connecting link module, the stopper link, the connecting arm and the like used in the cable protection and guide device according to the present invention, are engineering plastic resins such as polyamide 6, polyamide 12, polyamide 46, polyamide 66, acryl, polyacetal and the like. These materials endure bending strain generated during a bending operation and the device exhibits excellent dimensional. Particularly, when a fatigue resistant resin material in which elastomer or rubber component is contained in a polyamide resin or a polybutylene terephthalate resin is molded, the elastomer or rubber component contained in the polyamide resin or the polybutylene terephthalate resin adds flexibility and impact strength. The fatigue resistant resin material further exhibits impact resistance, fatigue resistance and it can sustain repeated bending without deformation. Thus the fatigue resistant resin material is preferably used.

BRIEF DESCRIPTION OF THE DRAWINGS

FIG. 6 is a perspective view explaining a connecting mechanism between adjacent connecting link units.

A cable or the like protection and guide device, which is an embodiment of the present invention, will be described using FIGS. 1 to 6.

DESCRIPTION OF THE INVENTION

Figure 1:
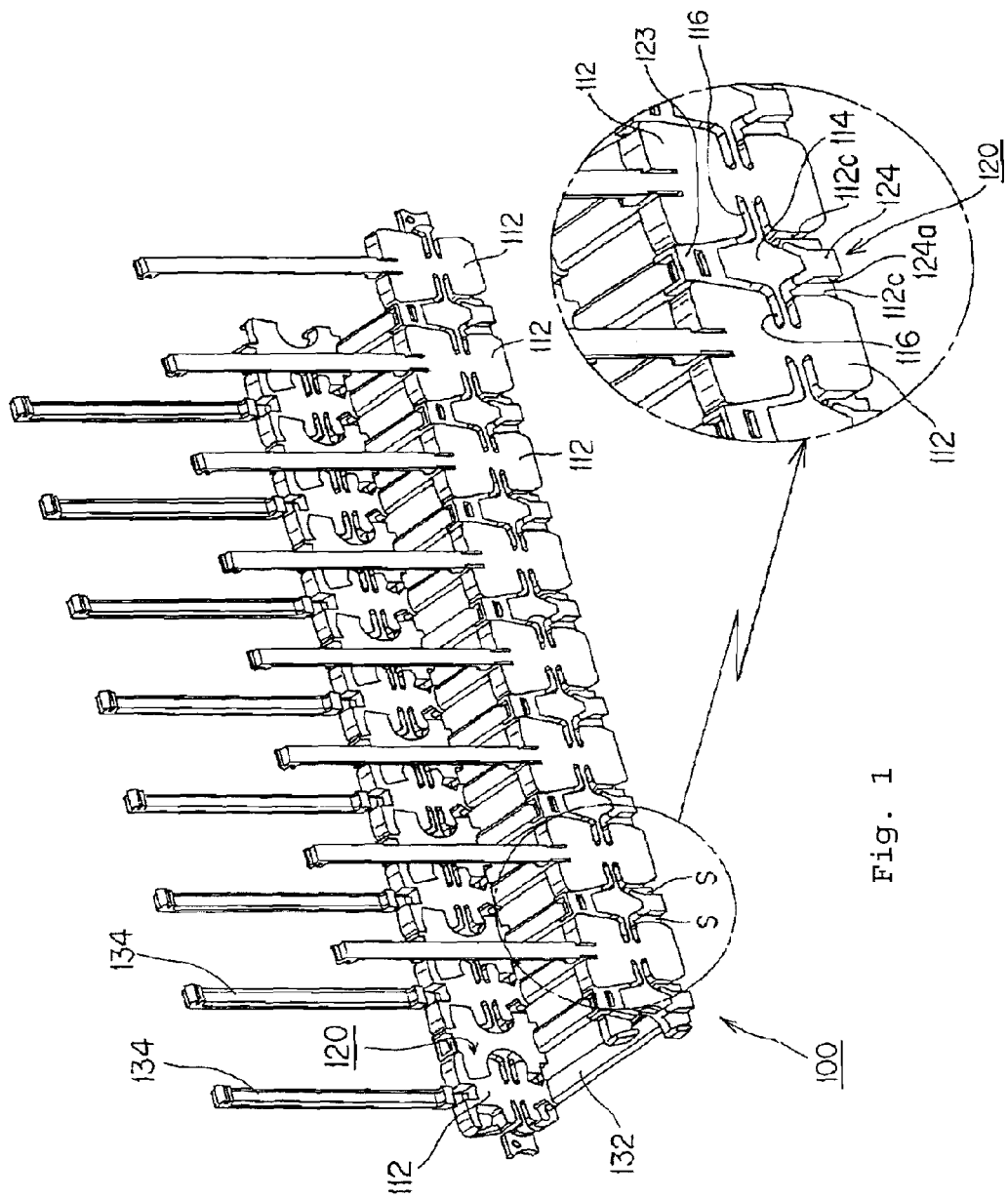
FIG. 1 is a perspective view showing a part of a cable or the like protection and guide device according to the present invention.

FIG. 1 is a perspective view showing the cable protection and guide device 100 which is an example of the present invention. Two comb teeth-shaped connecting link units are shown. Side plates having four connecting link modules and stopper links 120 are illustrated. Connecting arms 132 are integrally molded. The side plates are connected to each other by connecting links 132 on the bending inner circumferential side. The comb teeth-shaped portions are opposed to each other. Opening/closing arms are integrally molded on the bending outer circumferential side of the side plates.

Figure 2:
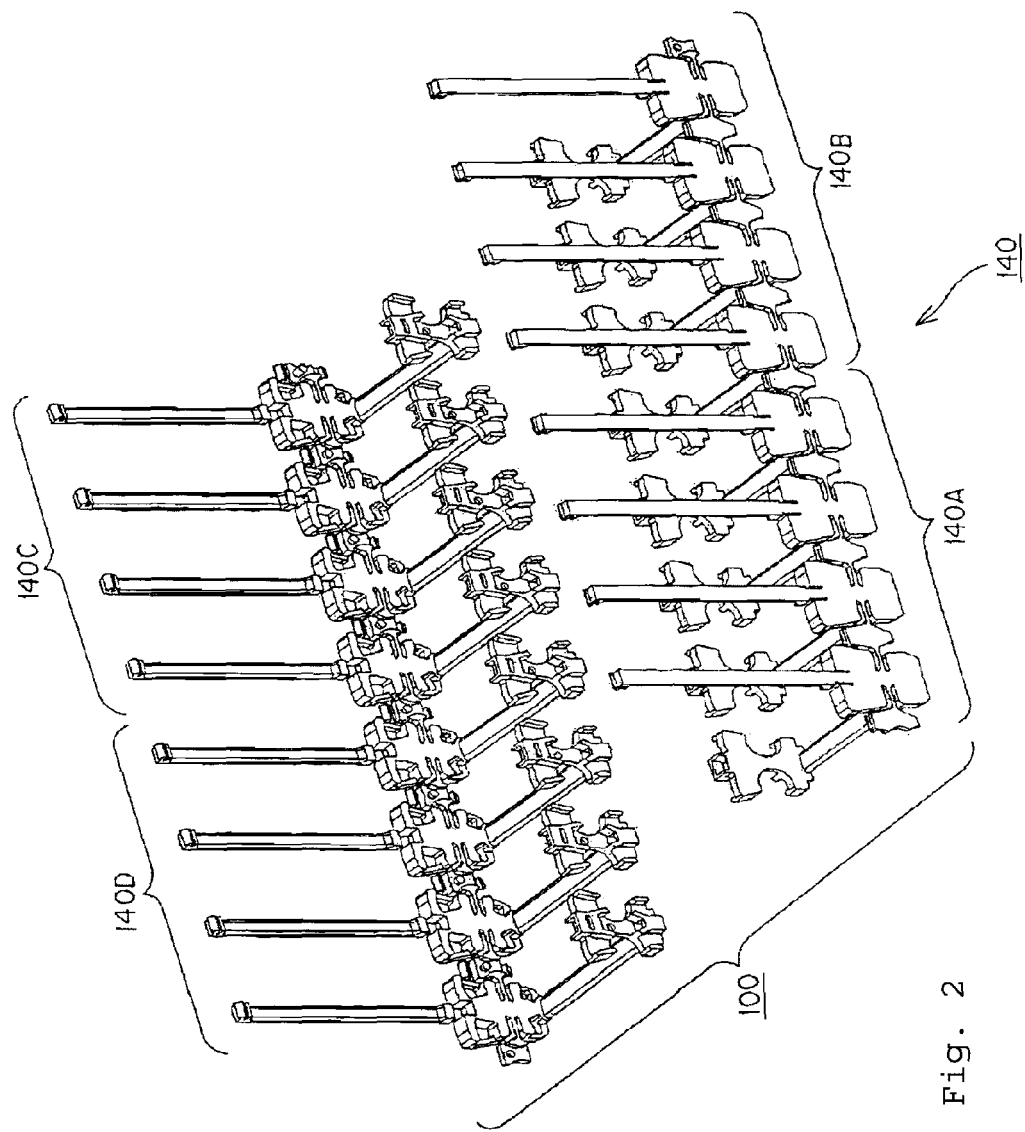
FIG. 2 is an exploded view of the cable or the like protection and guide device shown in FIG. 1.

Opening/closing arms 134 are opened in the partially enlarged view. FIG. 2 is an exploded view of the cable protection and guide device 100 shown in FIG. 1 before the assembly of the four comb teeth-shaped connecting link units 140A to 140D together. As shown in FIG. 2, the comb teeth-shaped portions are opposed.

Figure 3:
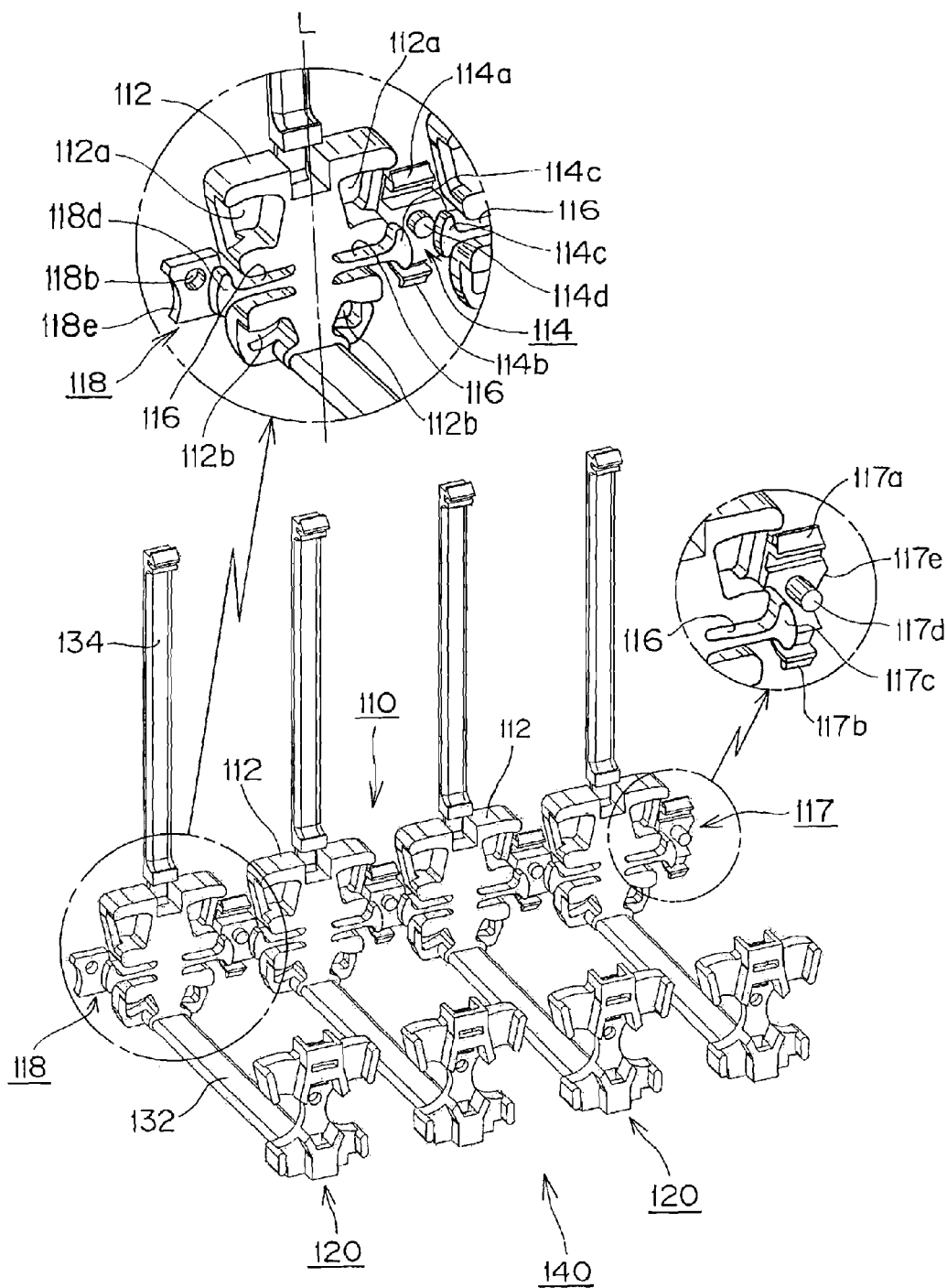
FIG. 3 is a perspective view of a comb teeth-shaped connecting link unit which is a component of the cable or the like protection and guide device shown in FIG. 1.

FIG. 3 is a perspective view showing a comb teeth-shaped connecting link unit 140. The comb teeth-shaped connecting link unit 140 includes connecting link modules 110. Four side plates 112 are connected to each other through coupling portions 114 and coupling portion arms 116 extended from coupling portions 114. Stopper links 120 are fitted between adjacent side plates 112, 112 forming the connecting link module 110. The stopper links limit the bending angle of the plates with respect to one another. Limiting the bending of the plates with respect to one another results in limiting the radius of curvature of the inner circumferential side of the cable protection and guide device. The plates are connected by integrally molded connecting arms 132 on the bending inner circumferential side. The plates are also interconnected by integrally molded opening/closing arms 134 when the opening/closing arms are in the closed position.

Figure 4:
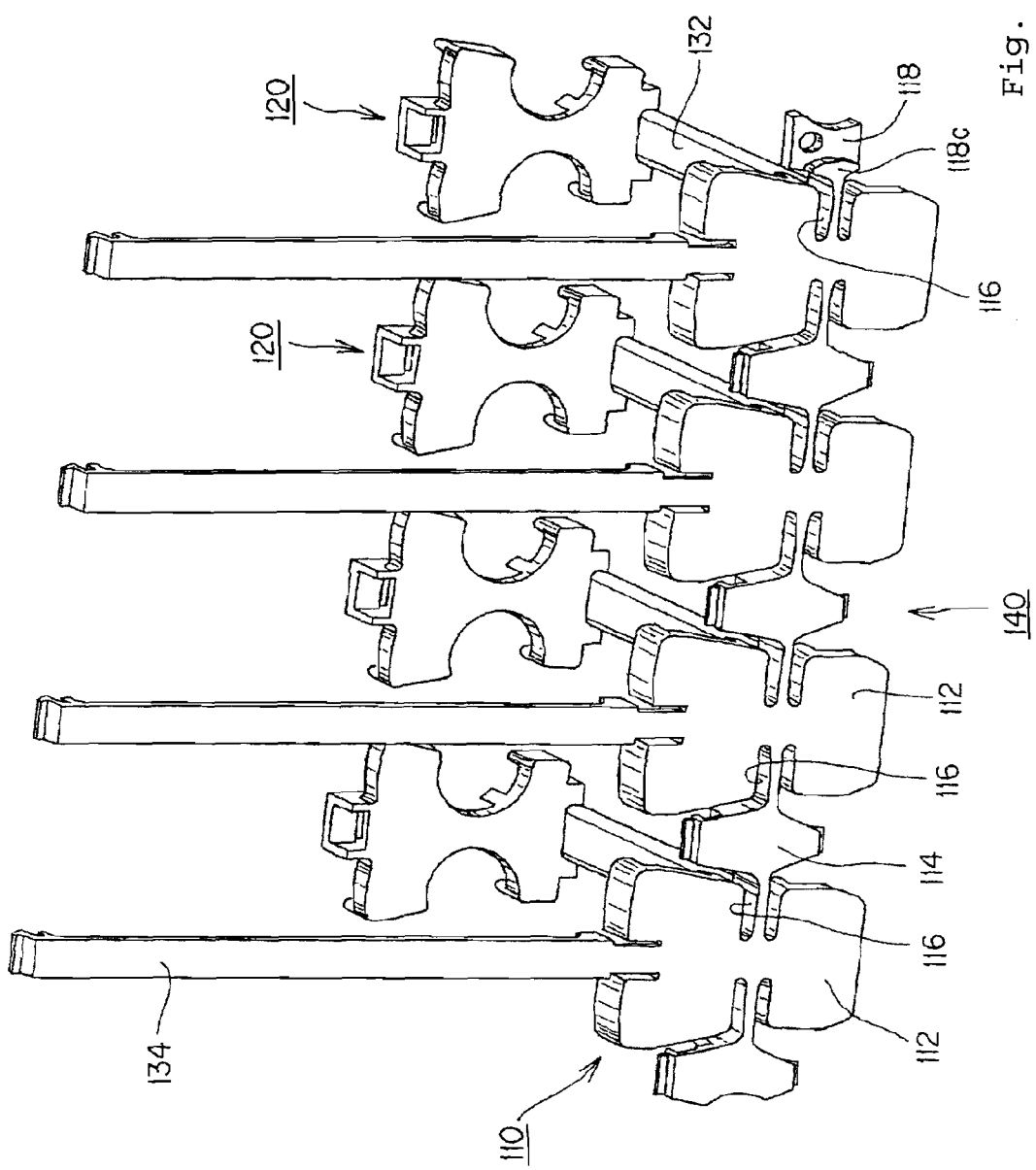
FIG. 4 is a perspective view of the comb teeth-shaped connecting link unit shown in FIG. 3 viewed from another direction.
Figure 5A:
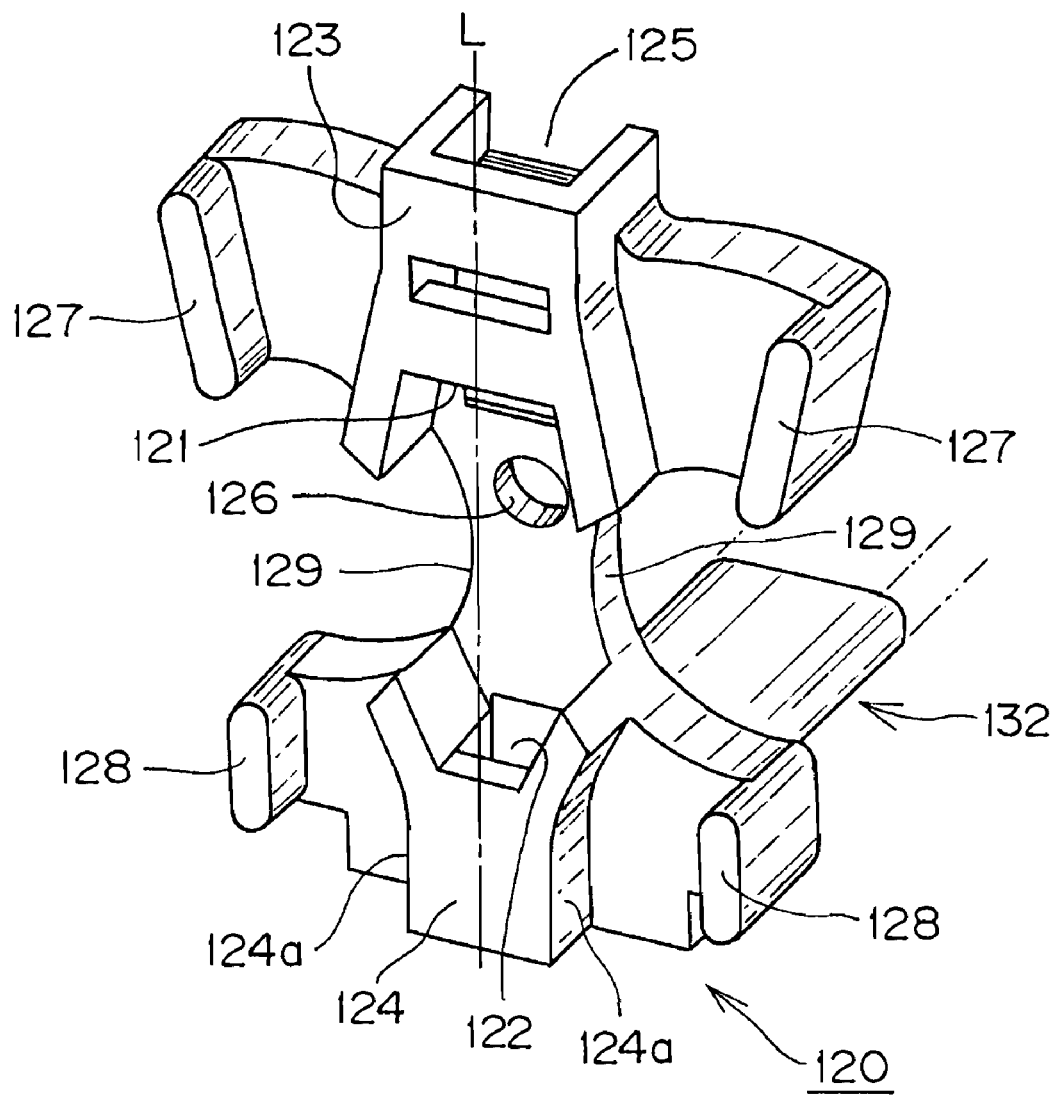
FIG. 5 is a perspective view of a stopper link which is a component of the comb teeth-shaped connecting link unit shown in FIGS. 3 and 4.
Figure 5B:
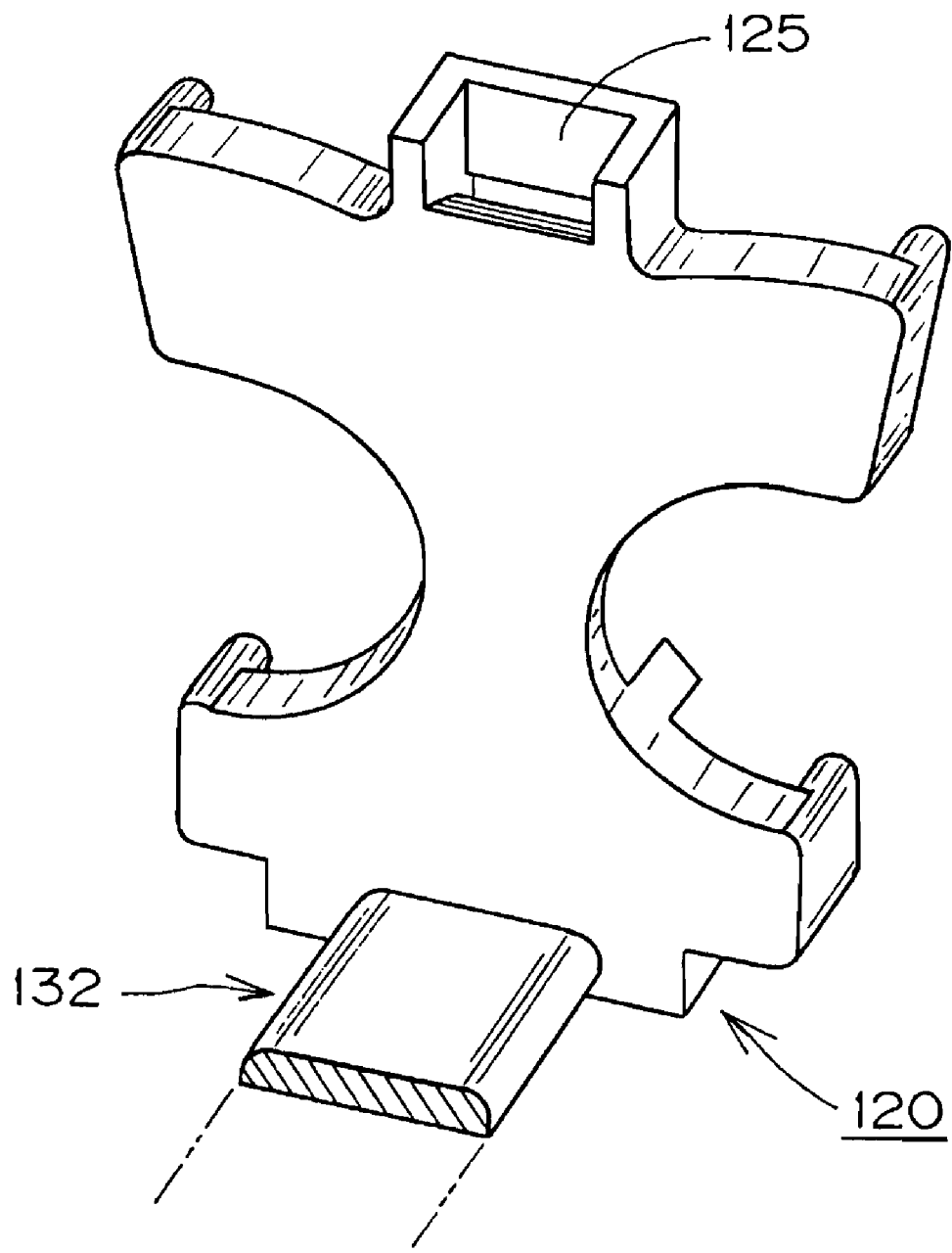
Figure 7:
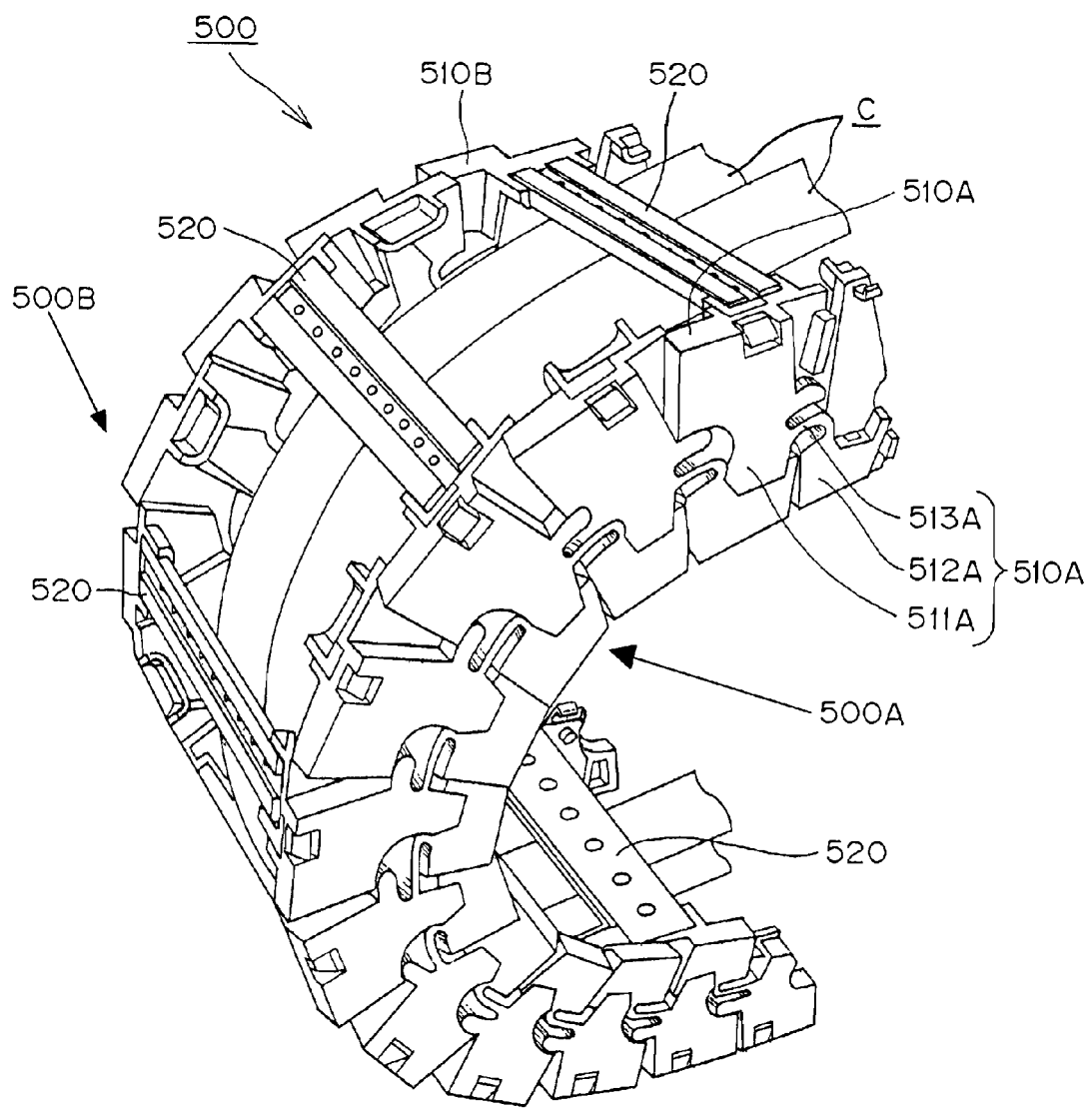
FIG. 7 is a perspective view showing a part of a conventional cable or the like protection and guide device.

FIG. 4 is a perspective view of the comb teeth-shaped connecting link unit 130 shown in FIG. 3. FIG. 5 is a perspective view of a stopper link 120 which is one of components of the connecting link unit 140 shown in FIGS. 3 and 4. FIG. 5(a) is a view showing the side of a stopper link 120 which is fitted to an opposite side connecting module 110. FIG. 5(b) is a perspective view of the stopper link from the perspective of the cable accommodating space.

The cable protection and guide device 100 of the present example is used for connecting between a movable section and a stationary section of a machine. The present example may be used in a semiconductor device, a pharmacy developing sample storage device, and a door opening/closing device for a vehicle. The present example protects and guides: cables such as an electric cable which performs transmission of electric signals and supply of power; and, a hose which supplies pressurized liquid and pressure gas. In the cable protection and guide device 100 of the present example, a number of side plates are connected to each other in a longitudinal direction to connect the above-described movable section to the stationary section. The device 100 assumes a linear position or a bending position in accordance with relative remote movement conditions between the movable section and the stationary section.

As shown in FIGS. 3 and 4, the cable protection and guide device comprises comb teeth-shaped connecting link units 140. Connecting link modules 110 are formed by connecting side plates 112 using coupling portions 114 and coupling portion arms 116 which extend from the coupling portions 114. Adjacent side plates 112 and stopper links 120 which fit between the adjacent side plates form the comb teeth-shaped connecting link unit 140. Connecting link modules 110 limit the bending angle, to wit, the relative bending movement of adjacent plates and the radius of curvature of the inner circumferential side. Comb teeth-shaped connecting link units 140 are formed by the side plates 112, connecting link modules 110, integral connecting arms and stopper links 120. Connecting arms 132 are integrally molded on a bending inner circumferential side. The comb teeth-shaped connecting units 140A, 140B and 140C, 140D are opposed to each other.

The number of side plates 112 forming a comb teeth-shaped connecting link unit 140 is not particularly limited. However, since two or three side plates 112 do not exhibit much of a reduction in the number of parts, connection of four or more side plates 112 is preferable.

As shown in FIG. 3, four side plates 112 form an elongated comb teeth-shaped connecting link unit 140. A horizontally extending coupling portion arm 116 terminates in a substantially diamond-shaped coupling portion 114 formed between adjacent side plates 112, 112. To connect the comb teeth-shaped connecting link units 140 to each other, a connecting hook 117 is formed at one end of the comb teeth-shaped connecting units 140 and a connecting plate 118 is formed on the other end of the comb teeth-shaped connecting units 140.

Stopper links 120 are included in the comb teeth-shaped connecting link units 140 shown in FIGS. 5(*a*) and 5(*b*). A snap-fit mechanism interconnects the stopper links to the coupling portion 114 so that a bending angles on the bending inner circumferential side and the bending angle on the outer circumferential side of the cable like protection and guide device 100 are limited. Namely, the inner circumferential side may bend or articulate but the outer circumferential side may not bend or articulate. In the present example, a convex portion 114*a* provided on the upper end portion of the coupling portion 114 shown in the enlarged view of FIG. 3 and a concave portion 121 provided on an upper portion of the stopper link 120 engage securing the coupling portion and the stopper link by means of a snap-fit. Further, in the present example a convex portion 114*b* provided on the lower end portion of the coupling portion 114 and a concave portion 122 provided on a lower portion of the stopper link 120 engaged securing the coupling portion and the stopper link by means of a snap-fit. The snap-fit mechanisms are formed by the interacting concave and convex parts. In this case a cylindrical convex portion 114*d* protrudently provided at a slightly upper portion from the center of the coupling portion 114 fits to a circular recess portion 126 provided at a slightly upper portion from the center of the stopper link 120 so that the connection between the coupling portion 114 and the stopper link 120 is strengthened.

Upper side convex portions 127 of the stopper link 120 shown in FIG. 5(*a*) mate with upper engagement regions 112*a* formed in the rear surface of a side plate 112 shown in an enlarged view of FIG. 3. The upper right and left of the sides of the rear surface of the side plates include engagement regions 112*a*. Lower side convex portions 128 of the stopper link 120 mate with lower engagement regions 112*b* formed in the lower right and left sides of the rear surface of the side plate 112. Further, arc-shaped convex portions 114*c* formed on the cable accommodating space side of the coupling portion 114 shown in the enlarged view of FIG. 3 come into sliding contact with arc portions 129 of the stopper link 120.

Further, in the stopper link shown in FIG. 5(*a*), an upper supporting portion 123 and a lower supporting portion 124 of the coupling portion are integrally molded. As shown in the enlarged view of FIG. 1, the upper supporting portion 123 of the coupling portion fits between adjacent side plate portions 112, 112. Use of this configuration limits the bending of the cable protection device so that it is not bent beyond a substantial straight line on the bending outer circumferential side. In other words, the cable protection device can only articulate (bend) about the inner circumferential side and cannot bend about the outer circumferential side. It is noted that the portions denoted by reference numeral 125 in FIGS. 5(*a*) and 5(*b*) are engagement recess portions with which an opening/closing end of the opening/closing arm 134 is engaged.

The lower supporting portion 124 of the stopper abuts the lower portion of the coupling portion 114 formed between the adjacent side plates 112, 112. Referring to FIGS. 5*a*, and 1, gaps S are formed between side surfaces 124*a* of the coupling portion lower supporting portion 124 and lower side surfaces 112*c* of adjacent side plates 112, 112. As shown in the enlarged view of FIG. 1, the abutment between the side surface 124*a* of the coupling portion lower supporting portion 124 and the lower side surfaces 112*c* of adjacent side plate portions 112 limits a bending angle on the bending inner circumferential side of the cable protection and guide device.

Comb teeth-shaped connecting link units include connecting mechanisms so as to interconnect a plurality of comb teeth-shaped connecting link units together. The connecting mechanisms will now be described. As shown in FIG. 3, on one end portion of a comb teeth-shaped connecting link unit 140, a connecting hook 117 having an outer appearance similar to the shape of the coupling portion 114 is formed. This connecting hook 117 has an arc-shaped cut-out portion 117*e* at the outermost side end portion. The coupling portion arm 116 includes an arc-shaped convex portion 117*c*. The connecting hook 117 is provided with a cylindrical convex portion 117*d* for interconnecting with the next adjacent comb teeth-shaped connecting link unit.

The other end portion of the comb teeth-shaped connecting link unit 140 includes a connecting plate 118 with an insertion hole 118*b* therein. FIG. 4 is an outside view of the connecting plate 118. The connecting plate 118 extends from the coupling portion arm 116. The coupling portion arm 116 includes an arc-shaped convex portion 118*c* having the same shape as that formed on the coupling portion 114 as shown in FIG. 3. An arc-shaped convex portion 118*d* as shown in FIG. 3 is formed on the opposite side of the connecting plate 118. An insertion hole 118*b* through which the cylindrical convex portion 117*d* of the connecting hook 117 is loosely penetrated is illustrated in FIG. 3.

When the connecting hook 117 and the connecting plate 118 abut, the arc-shaped cut-out portion 117*e* of the connecting hook 117 shown in FIGS. 3 and 6 and the arc-shaped convex portion 118*c* of the connecting plate 118 shown in FIG. 4 are fitted to each other. The cylindrical convex portion 117*d* of the connecting hook 117 loosely penetrates the insertion hole 118*b* of the connecting plate 118. The cylindrical convex portion 117*d* is fitted to the circular recess portion 126 of the stopper 120. See FIG. 6. A convex portion 117*a* provided on an upper end portion of the connecting hook 117 and a concave portion 121 provided on an upper portion of the stopper link 120 engage. Simultaneously, a convex portion 117b provided on a lower end portion of the connecting hook 117 and a concave portion 122 provided on a lower portion of the stopper link 120 engage. Thus, the aforesaid structure forms a snap-fit mechanism so that two comb teeth-shaped connecting link units 140A, 140D, for example, are connected to each other. The arc-shaped convex portion 117c engages the arc-shaped cut-out portion 118e formed on the outermost side end portion of the connecting plate 118 of the next adjacent comb teeth-shaped connecting link unit. Simultaneously, an arc-shaped portion 129 of the stopper link 120 engages arc-shaped convex portion 118d of the connecting plate 118 shown in FIG. 3.

The side plates 112, the coupling portions, the connecting arms, the opening/closing arms and the stopper links 120 form the comb teeth-shaped connecting link unit 140. Each of the side plates is symmetric central vertical line L as shown in the enlarged view of FIG. 3 and FIG. 5(a). Pairs of comb teeth-shaped connecting link units 140 are interconnected with each other. The connecting link units 140 can be used without considering the right and left sides because they are symmetric.

DESCRIPTION OF REFERENCE NUMERALS

100 . . . Cable or the like protection and guide device
110 . . . Connecting link module
112 . . . Side plate portion
112a . . . Upper engagement region (of side plate portion)
112b . . . Lower engagement region (of side plate portion)
112c . . . Lower side surface (of side plate portion)
114 . . . Coupling portion
114a, 114b . . . Convex portion (which forms snap-fit mechanism of coupling portion)
114c . . . Arc-shaped convex portion (of coupling portion)
114d . . . Cylindrical convex portion (of coupling portion)
116 . . . Coupling portion arm
117 . . . Connecting hook
117a, 117b . . . Convex portion (which forms snap-fit mechanism of connecting hook)
117c . . . Arc-shaped convex portion (of connecting hook)
117d . . . Cylindrical convex portion (of connecting hook)
117e . . . Arc-shaped cut-out portion (of connecting hook)
118 . . . Connecting plate
118b . . . Insertion hole (of connecting plate)
118c, 118d . . . Arc-shaped convex portion (of connecting plate)
118e . . . Arc-shaped cut-out portion (of connecting plate)
120 . . . Stopper link
121, 122 . . . Concave portion (which forms snap-fit mechanism of stopper link)
123 . . . Coupling portion upper supporting portion (of stopper link)
124 . . . Coupling portion lower supporting portion (of stopper link)
125 . . . Engagement concave portion (of stopper link)
126 . . . Circular recess portion (of stopper link)
127 . . . Upper side convex portion (of stopper link)
128 . . . Lower side convex portion (of stopper link)
129 . . . Arc portion (of stopper link)
132 . . . Connecting arm
134 . . . Opening/closing arm
140 (140A, 140B, 140C, 140D) . . . Connecting link unit The invention has been set forth by way of example only. Those skilled in the art will readily recognize that changes may be made to the invention without departing from the spirit and scope of the appended claims.

The invention claimed is:

1. A cable protection and guide device, comprising: a plurality of spaced side plates articulately connected to each other in a longitudinal direction enabling said side plates to form a flexional circumferential bend having a flexional inner circumferential side and flexional outer circumferential side; each of said side plates includes a flexional inner circumferential side residing during bending on said flexional inner circumferential side of said bend; each of said side plates includes an outer circumferential side residing during bending on said outer flexional circumferential side of said bend; connecting arms are integrally formed with said plates and are bridged over said bending inner circumferential side of said side plates at predetermined intervals; opening/closing arms are integrally formed with said plates and are bridged over said bending outer circumferential side of said side plates at predetermined intervals; a cable is accommodated in a cable accommodating space surrounded by said side plates and said connecting arms; coupling portions are interposed between said side plates interconnecting said side plates together; stopper links; said side plates, said interposed coupling portions, said connecting arms, said stopper links and said opening/closing arms form first and second comb teeth-shaped connecting link units; said first comb teeth-shaped connecting link units interengage oppositely oriented said second comb teeth-shaped connecting link units; said stopper links of said first comb teeth-shaped connecting link unit interengaging said coupling portions of said second comb teeth-shaped connecting link units, said stopper links of said second comb teeth-shaped connecting link units interengaging said coupling portions of said first comb teeth-shaped connecting link unit; and, said stopper links limit the bending angle of the device.

2. A cable protection and guide device according to claim 1, wherein said side plates are symmetric in shape with respect to the central vertical line.

3. A cable protection and guide device according to claim 1, wherein said stopper links are symmetric in shape with respect to the central vertical line.

4. A cable protection and guide device according to claim 2, wherein said stopper links are symmetric in shape with respect to the central vertical line.

5. A cable protection and guide device according to claim 1 wherein each of said coupling portions includes first and second convex portions and each of said stoppers includes first and second recesses, and, said first convex portion of said coupling portion engages said first recess of said stopper link and said second convex portion of said coupling portion engages said second recess of said stopper link.

6. A cable protection and guide device according to claim 2 wherein each of said coupling portions includes first and second convex portions and each of said stoppers includes first and second recesses, and, said first convex portion of said coupling portion engages said first recess of said stopper link and said second convex portion of said coupling portion engages said second recess of said stopper link.

7. A cable protection and guide device according to claim 3 wherein each of said coupling portions includes first and second convex portions and each of said stoppers includes first and second recesses, and, said first convex portion of said coupling portion engages said first recess of said stopper link and said second convex portion of said coupling portion engages said second recess of said stopper link.

8. A cable protection and guide device according to claim 4 wherein each of said coupling portions includes first and second convex portions and each of said stoppers includes first and second recesses, and, said first convex portion of said coupling portion engages said first recess of said stopper link and said second convex portion of said coupling portion engages said second recess of said stopper link.

9. A cable protection and guide device according to claim 1 wherein each of said comb teeth-shaped connecting link units includes a connecting mechanism, said mechanism includes a connecting hook formed at one end of the comb teeth-shaped connecting units and a connecting plate formed on the other end of the comb teeth-shaped connecting units.

10. A cable protection and guide device according to claim 2 wherein each of said comb teeth-shaped connecting link units includes a connecting mechanism, said mechanism includes a connecting hook formed at one end of the comb teeth-shaped connecting units and a connecting plate formed on the other end of the comb teeth-shaped connecting units.

11. A cable protection and guide device according to claim 3 wherein each of said comb teeth-shaped connecting link units includes a connecting mechanism, said mechanism includes a connecting hook formed at one end of the comb teeth-shaped connecting units and a connecting plate formed on the other end of the comb teeth-shaped connecting units.

12. A cable protection and guide device according to claim 4 wherein each of said comb teeth-shaped connecting link units includes a connecting mechanism, said mechanism includes a connecting hook formed at one end of the comb teeth-shaped connecting units and a connecting plate formed on the other end of the comb teeth-shaped connecting units.

* * * * *